(12) United States Patent
Kim

(10) Patent No.: US 8,296,355 B2
(45) Date of Patent: Oct. 23, 2012

(54) TERMINAL FOR SUPPORTING DYNAMIC CONTENTS DELIVERY SERVICE, AND SYSTEM THEREOF

(75) Inventor: Suk-Kun Kim, Incheon (KR)

(73) Assignee: LG Electronics Inc., Seoul (KR)

( * ) Notice: Subject to any disclaimer, the term of this patent is extended or adjusted under 35 U.S.C. 154(b) by 1043 days.

(21) Appl. No.: 11/504,035

(22) Filed: Aug. 15, 2006

(65) Prior Publication Data

US 2007/0043836 A1 Feb. 22, 2007

(30) Foreign Application Priority Data

Mar. 10, 2006 (KR) .................. 10-2006-0022865

(51) Int. Cl.
*G06F 15/16* (2006.01)
*G01C 21/00* (2006.01)

(52) U.S. Cl. ........ 709/203; 709/217; 709/218; 709/219; 701/200; 701/201; 701/202; 701/203

(58) Field of Classification Search .................. 709/203; 715/700–866; 701/200–302
See application file for complete search history.

(56) References Cited

U.S. PATENT DOCUMENTS

| | | | | |
|---|---|---|---|---|
| 6,336,072 B1 * | 1/2002 | Takayama et al. | ............ | 701/200 |
| 6,587,127 B1 * | 7/2003 | Leeke et al. | .................. | 715/733 |
| 6,826,594 B1 * | 11/2004 | Pettersen | ..................... | 709/203 |
| 6,999,992 B1 * | 2/2006 | Deen et al. | ..................... | 709/219 |
| 7,720,486 B2 * | 5/2010 | Ross et al. | ................. | 455/456.1 |
| 2002/0068554 A1 * | 6/2002 | Dusse | ............................ | 709/219 |
| 2002/0165665 A1 * | 11/2002 | Kim | .............................. | 701/209 |
| 2003/0190044 A1 * | 10/2003 | Higashi et al. | .................. | 705/57 |
| 2005/0140524 A1 * | 6/2005 | Kato et al. | ..................... | 701/201 |
| 2006/0117345 A1 * | 6/2006 | Ito | .................................. | 725/38 |
| 2006/0195545 A1 * | 8/2006 | Kikkawa et al. | .............. | 709/217 |
| 2006/0291396 A1 * | 12/2006 | Hamilton et al. | ............ | 370/238 |

FOREIGN PATENT DOCUMENTS

| | | |
|---|---|---|
| KR | 10-2001-0100475 A | 11/2001 |
| KR | 10-2002-0006507 A | 1/2002 |
| KR | 2003-0039046 A | 5/2003 |
| KR | 10-2003-0079131 A | 10/2003 |
| KR | 10-2004-0045803 A | 6/2004 |
| KR | 10-2004-0065340 A | 7/2004 |
| KR | 10-2005-0036281 A | 4/2005 |
| KR | 10-2005-0072461 A | 7/2005 |
| KR | 10-0736670 B1 | 7/2007 |

* cited by examiner

*Primary Examiner* — Ian N Moore
*Assistant Examiner* — Jenee Williams
(74) *Attorney, Agent, or Firm* — Birch, Stewart, Kolasch & Birch, LLP

(57) ABSTRACT

A terminal for supporting a dynamic content delivery (DCD) service a system thereof, and method thereof. A general terminal cannot provide information specialized for individuals. In order to solve the foregoing problem, there is provided a method for delivering contents includes the steps of: acquiring contents at a DCD server; personalizing, at the DCD server, the acquired contents; providing, at the DCD server, the personalized contents to a terminal; receiving and storing the personalized contents at the terminal; and driving the personalized contents at the terminal.

6 Claims, 6 Drawing Sheets

(a)

(b)

(c)

TERMINAL FOR SUPPORTING DYNAMIC CONTENTS DELIVERY SERVICE, AND SYSTEM THEREOF

BACKGROUND OF THE INVENTION

1. Field of the Invention

The present invention relates to a terminal and a system thereof, and more particularly, to a terminal for supporting a dynamic contents delivery (hereinafter, referred to as 'DCD') service and a system thereof.

2. Description of the Background Art

Recently, as mobile communication and information industry technologies make rapid progress, users prefer and buy mobile communication terminals having advanced functions.

With the buying tendency of the users, mobile communication terminal manufacturing companies devote all their energies to bring out mobile communication terminals having more various functions earlier than the other companies. Recently, there has been suggested a mobile communication terminal having an active desktop function.

Here, the active desktop function means a function of periodically downloading a plurality of online contents from a server, and sequentially displaying the online contents on a pre-set region of a display unit of the terminal.

However, even though the terminal using the active desktop function periodically downloads the contents from the server and displays the contents, it cannot download contents specialized for individuals and provide appropriate contents at the right time.

SUMMARY OF THE INVENTION

Therefore, an object of the present invention is to provide a terminal for supporting a DCD service which can receive personalized contents, and a system thereof.

To achieve these and other advantages and in accordance with the purpose of the present invention, as embodied and broadly described herein, there is provided a terminal, including: a first module for selectively providing personalization information to a server, receiving personalized contents from the server, and storing the personalized contents; and a second module for driving the personalized contents.

According to another aspect of the present invention, there is provided a terminal, including: a first module for receiving contents from a server, and personalizing the received contents; and a second module for driving the personalized contents.

According to yet another aspect of the present invention, there is provided a system, including: a DCD server for acquiring contents, and providing the contents to a terminal; the terminal for receiving the contents from the DCD server, storing the contents, and driving the received contents.

According to yet another aspect of the present invention, there is provided a method for providing a DCD service in a terminal, including the steps of: providing personalization information to a server; receiving personalized contents from the server, and storing the personalized contents; and driving the personalized contents.

According to yet another aspect of the present invention, there is provided a method for providing a DCD service in a terminal, including the steps of: receiving contents from a server; personalizing the received contents; and driving the personalized contents.

According to yet another aspect of the present invention, there is provided a method for providing a DCD service in a terminal, including the steps of: receiving personalized contents corresponding to a pre-set condition from a DCD server, when the pre-set condition is satisfied; and driving the personalized contents.

According to yet another aspect of the present invention, there is provided a method for delivering contents, including the steps of: acquiring contents at a DCD server; personalizing, at the DCD server, the acquired contents; providing, at the DCD server, the personalized contents to a terminal; receiving and storing the personalized contents at the terminal; and driving the personalized contents at the terminal.

According to yet another aspect of the present invention, there is provided a method for delivering contents, including the steps of: acquiring contents at a DCD server; providing, at the DCD server, the contents to a terminal; receiving the contents at the terminal, and personalized the received contents; and driving the personalized contents at the terminal.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

A structure of a terminal and a method for executing a DCD service in the terminal in accordance with the preferred embodiments of the present invention will now be described in detail with reference to the accompanying drawings.

In this description, a DCD service is a service for delivering personalized contents to the terminal.

Figure 1:
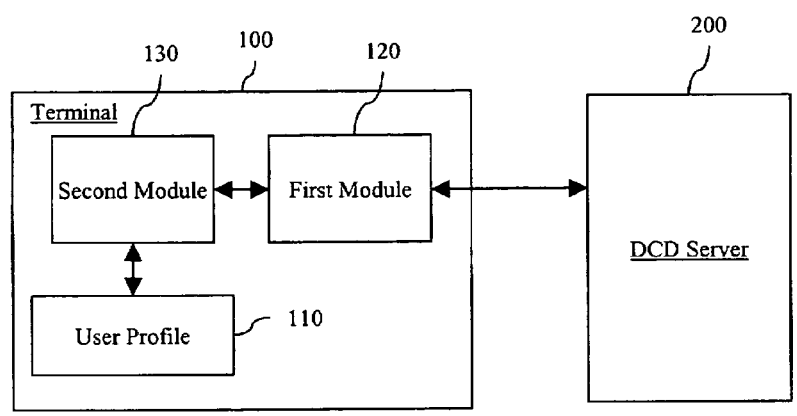
FIG. 1 is a block diagram illustrating a DCD system in accordance with a preferred embodiment of the present invention.
Figure 6:
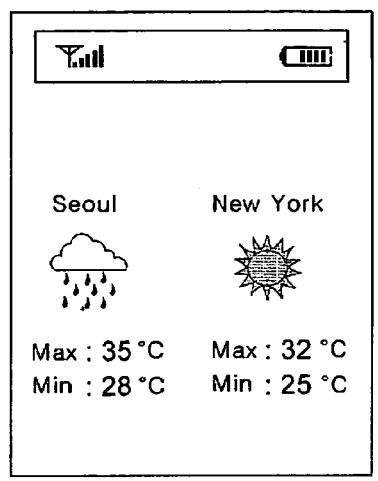
FIGS. 6a to 6c are exemplary diagrams illustrating DCD service screens executed on the terminal of FIG. 1.
Figure 6:
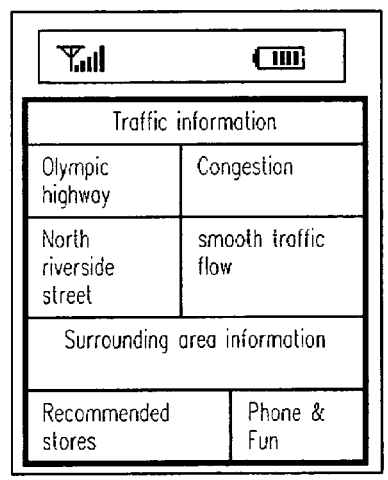
Figure 6:
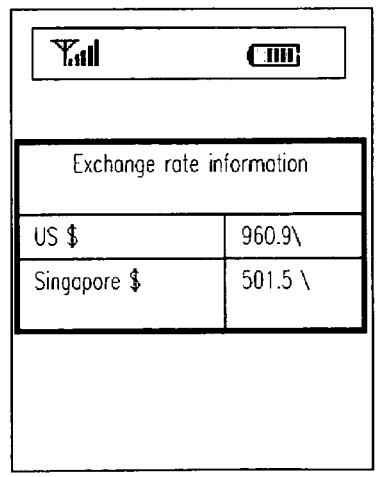

FIG. 1 is a block diagram illustrating a terminal for supporting the DCD service and a system thereof in accordance with a preferred embodiment of the present invention, and FIG. 6 is an exemplary diagram illustrating DCD service screens executed on the terminal of FIG. 1.

FIG. 1 will now be explained with FIG. 6.

Referring to FIG. 1, the system includes the terminal 100 for supporting the DCD service, and a DCD server 200.

In detail, the terminal 100 for supporting the DCD service includes a user profile 110, a first module 120 and a second module 130.

The user profile 110 includes personalization information, in more detail, a condition set by a user or generated by automatically analyzing patterns of using of contents by the user. Preferably, the condition includes at least one of a geographical position variation of the terminal 100, coming of a designated time and an externally-inputted value. The personalization information set in the user profile 100 can be provided to the DCD server 200 by the request.

Preferably, the user profile 110 can be stored in a detachable memory means such as an SIM or UIM. Here, the SIM and the UIM are detachable smart cards including a microprocessor and a memory chip. It is easily understood by the ordinary people in the field to which the present invention pertains, and thus detailed explanations thereof are omitted.

The first module 120 receives contents from the DCD server 200. For example, the contents can be broadcast contents, contents of a specific channel selected by the user, or personalized contents. Here, the broadcast contents can be contents transmitted from the DCD server 200 to many and unspecified terminals, and the contents of the specific channel can be contents preferred by the user, such as music, motion picture, still image, cartoon, e-book, game and news. The personalized contents can be specific contents customized to the terminal 100's the user, such as news, weather information, stock information and exchange rate information to be provided to the user in a specific time point, and information provided to the user according to the position of the terminal 100, such as traffic information, surrounding area information and information relating to a specific region. The first module 120 can directly receive the personalized contents from the DCD server 200, or indirectly acquire the personalized contents by selecting the personalized contents among the contents to be received from the DCD server 200 by itself.

The first module 120 can receive the contents from the DCD server 200 in various ways, for example, a push method for providing the contents from the DCD server 200 to the terminal 100 without the request of the terminal 100, and a pull method for receiving the contents by the request. The pull method will later be described with explanation of the second module 130. The push method is easily understood by the ordinary people in the field to which the present invention pertains, and thus detailed explanations thereof are omitted.

On the other hand, the second module 130 drives the received contents. Here, the terms of driving the contents means playing back the personalized contents and the broadcast contents, namely, displaying the contents or outputting sound contained in the contents. Preferably, playing back the contents is playing back the title or part of the contents. The title or part of the contents can be played back in a ticker type. Accordingly, the contents can be efficiently visually provided to the user. That is, since the whole contents are not played back, the user can comfortably use another function of the terminal 100. If an external request, namely, a user request is made on the contents whose title or part has been played back, the second module 130 transmits the request for additional information to the first module 120, so that the first module 120 can receive the additional information.

The second module 130 transmits the contents request to the first module 120 so that the first module 120 can receive the contents from the DCD server 200 by the pull method. Here, the contents request can include a contents ID.

The contents request can be made by the following two methods. That is, the contents request is made when the user arbitrarily requests the contents, or the contents request is automatically made by the second module 130 when the condition included in the user profile 110 is satisfied. The latter will now be explained in detail. When the condition included in the user profile 110 is satisfied, the second module 130 generates a DCD event and transmits the contents request to the first module 120. The first module 120 transmits a contents request to the DCD server 200 and receives the contents. Whether the condition is satisfied can be directly monitored by the second module 130. Also, the condition can be regarded as being satisfied by an externally-inputted value, namely, a direct command from the user.

For example, when the condition is 8:30 a.m., if it is 8:30 a.m., the second module 130 transmits the contents request to the first module 120 in order to drive the services necessary at the time, such as weather information of FIG. 6a, news and e-mail. As another example, when the condition is the geographical position variation, if the geographical position of the terminal 100 is confirmed, the second module 130 transmits the contents request to the first module 120 in order to drive the traffic information and the surrounding area information of FIG. 6b or the information relating to the specific region. As yet another example, when the condition is satisfied by a direct command of the user for receiving the exchange rate information of FIG. 6c, contents of pre-set specific category (or channel) such as music, music video and show business news, or contents of a specific channel, the second module 130 transmits the contents request to the first module 120 in order to drive the contents. Such examples can be appropriately combined. For instance, if the condition is satisfied by the direct command of the user for receiving the contents existing within the pre-set specific category range or the contents of the specific channel, the second module 130 can transmit the contents request. Thereafter, if the geographical position variation of the terminal 100 is confirmed, the second module 130 can transmit the contents request to drive the traffic information, the surrounding area information or the information relating to the specific region.

On the other hand, when the condition is not satisfied or is completed, the second module 130 can drive the broadcast contents from the DCD server 200.

However, when the condition is re-satisfied, the second module 130 can request the first module 120 to stop receiving the broadcast contents, thereby preventing a communication fee from being excessively imposed on the terminal 100, and the user from being confused by a few contents received and driven at the same time.

In addition, if the condition different from the satisfied condition is satisfied, the second module 130 generates an event corresponding to the new condition, and requests interruption of reception of the driven personalized contents.

Although not illustrated, the components of the terminal 100 explained above, for example, the first module 120 can be comprised of a processor and an RF transmitting/receiving unit, and the second module 130 can be comprised of a display unit and a sound output unit. It is easily understood by the ordinary people in the field to which the present invention pertains, and thus detailed explanations thereof are omitted.

The DCD server 200 provides the broadcast contents, the contents existing within the specific channel range, and the personalized contents to the terminal 100. Here, the DCD server 200 can acquire the contents through an external contents provision server.

As described above, the DCD server 200 can provide the broadcast contents by the push method, and the contents existing within the specific channel range and the personalized contents by the pull method, namely, at the request of the terminal 100. However, it must be recognized that the DCD server 200 can also provide the contents existing within the specific channel range and the personalized contents by the push method.

In the case that the DCD server 200 provides the contents, especially, the personalized contents by the pull method, the DCD server 200 can provide the personalized contents only at the contents request of the terminal 100. Here, in order to provide the personalized contents, the DCD server 200 can personalize the stored contents. In other word, the DCD server 200 can select the contents customized to the terminal 100's a user among the stored contents. The personalized contents can be selected by a contents ID included in the contents request from the terminal 100, or personalization information that can be received from the terminal 100 by a special request. Also, the personalized contents can be selected by acquiring the personalization information from an external server.

In addition, in the case that the DCD server 200 provides the contents, especially, the personalized contents by the push method, the DCD server 200 monitors whether the condition pre-set in the terminal 100 is satisfied, and selects and provides the personalized contents according to the result.

On the other hand, when transmitting the personalized contents, the DCD server 200 can stop transmitting the broadcast contents, thereby preventing a communication fee from being excessively imposed on the terminal 100.

If the condition different from the condition satisfied in the terminal 100 is newly satisfied, the DCD server 200 stops transmitting the personalized contents, and transmits personalized contents corresponding to the new condition.

The DCD server 200 can transmit only the title or part of the contents. However, the DCD server 200 can transmit detailed information on the contents at the request of the terminal 100. Here, the DCD server 200 can charge the terminal 100 a fee for the detailed information. The technical contents for the charging process are easily understood by the ordinary people in the field to which the present invention pertains, and thus detailed explanations thereof are omitted.

Although not illustrated, as obvious to the ordinary people in the art, the DCD server 200 can be comprised of a processor, a network interface and a storing device.

The structures of the terminal 100 for supporting the DCD service and the DCD server 200 in accordance with the preferred embodiment of the present invention have been described. The operations thereof will now be explained in more detail.

Figure 2:
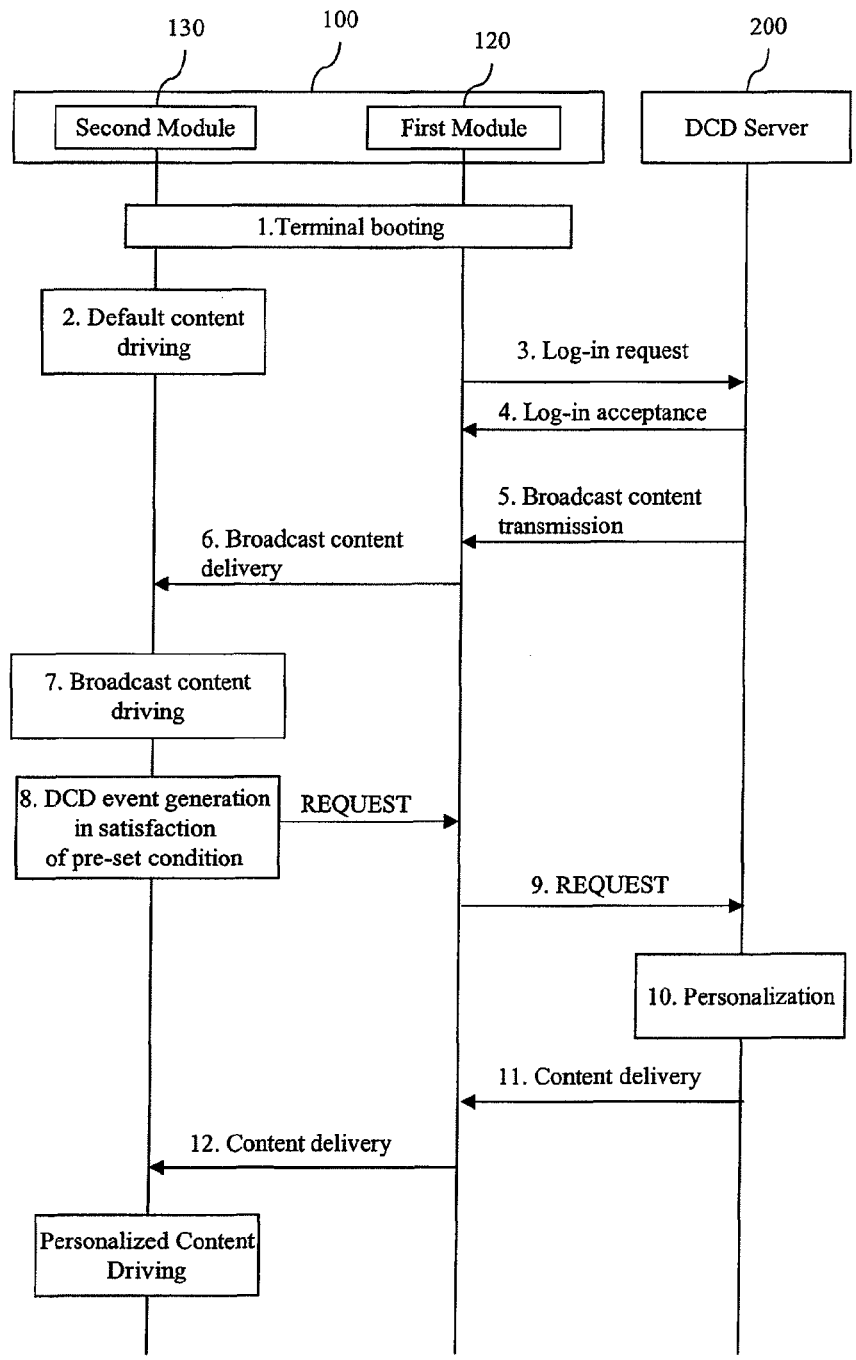
FIG. 2 is an exemplary flowchart showing operations between a terminal and a server of FIG. 1.
Figure 3:
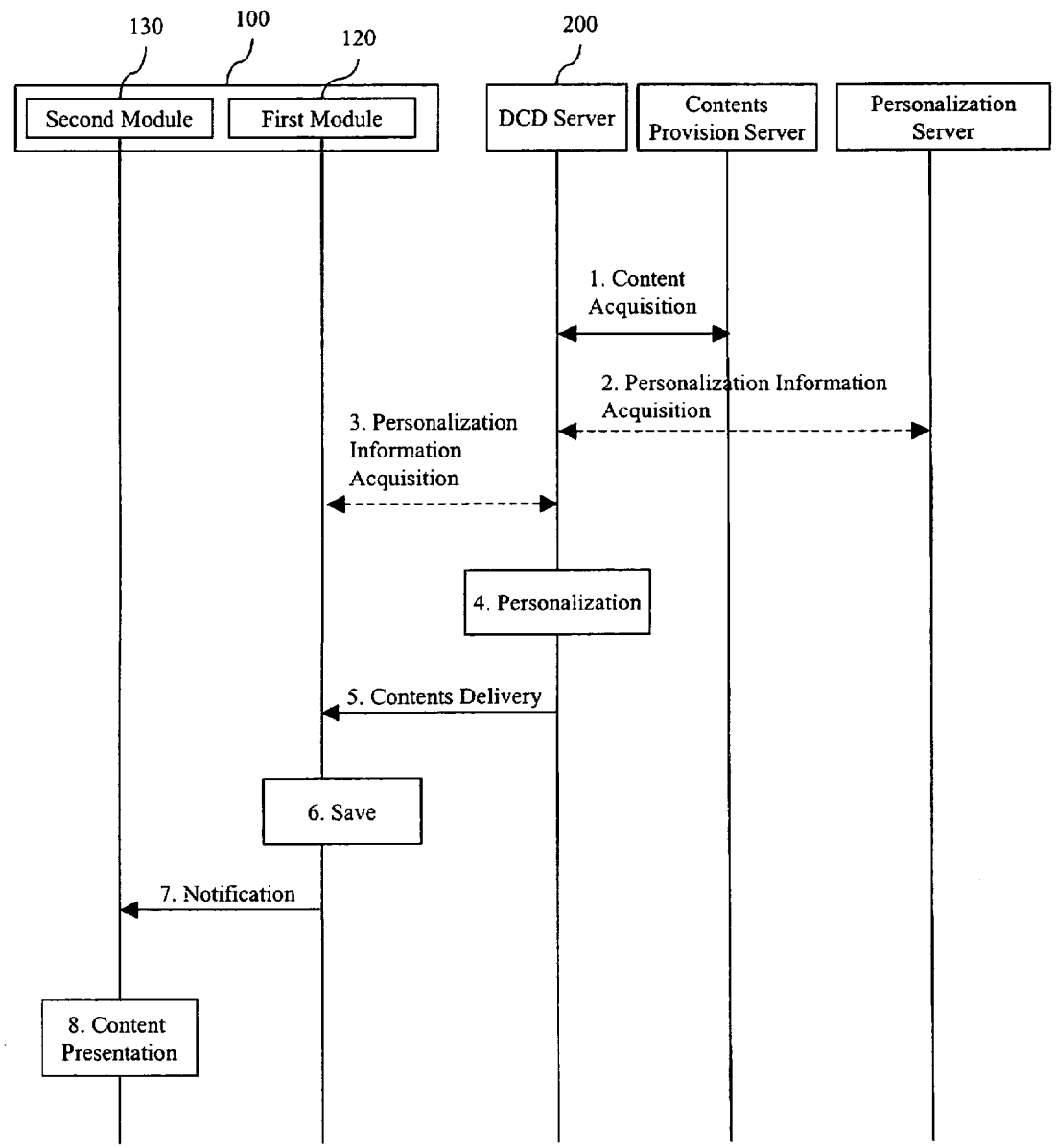
FIG. 3 is another exemplary flowchart showing operations between the terminal and the server of FIG. 1.
Figure 4:
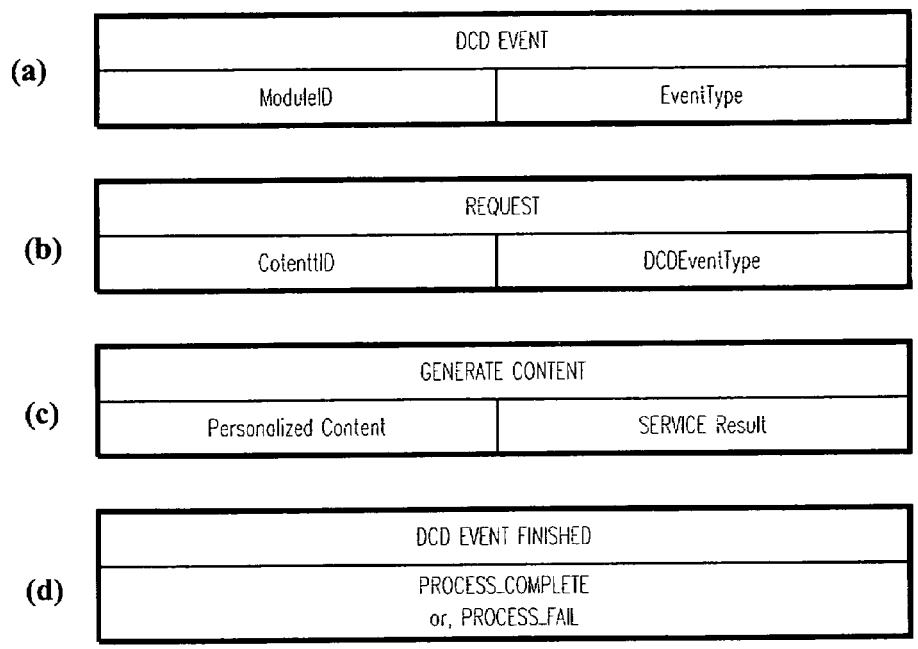
FIG. 4 is an exemplary diagram illustrating signals generated in the operations between the terminal and the server of FIGS. 2 and 3.

FIG. 2 is an exemplary flowchart showing the operations between the terminal and the server of FIG. 1, FIG. 3 is another exemplary flowchart showing the operations between the terminal and the server of FIG. 1, and FIG. 4 is an exemplary diagram illustrating signals generated in the operations between the terminal and the server of FIGS. 2 and 3.

As illustrated in FIG. 2, when the terminal 100 is booted, the terminal 100 drives default contents, is registered in the DCD server 200, and receives and drives broadcast contents from the DCD server 100. If the pre-set condition is satisfied, the terminal 100 receives and drives personalized contents. The operations between the terminal 100 and the DCD server 200 will now be explained in detail.

(1) First, the terminal 100 for the DCD service is booted.

(2) The second module 130 of the terminal 100 drives default contents. Here, the default contents can be summarized information on the receivable contents, or summarized information on the contents previously received by the terminal 100.

(3) The first module 120 makes a log-in request to the DCD server 200.

(4) The DCD server 200 receiving the log-in request confirms whether the terminal 100 has been registered as a member, and accepts the log-in request. The terminal 100 is in a standby state for receiving the DCD service from the DCD server 200.

(5) The first module 120 receives broadcast contents from the DCD server 200.

(6) The first module 120 receives the broadcast contents, and transmits the broadcasts contents to the second module 130.

(7) The second module 130 drives the received broadcast contents. Here, driving the broadcast contents can be displaying or sound-outputting the title or part of the broadcast contents.

(8) When the pre-set condition is satisfied, the second module 130 generates a DCD EVENT and transmits a REQUEST message to the first module 120.

Preferably, as shown in FIG. 4a, the DCD EVENT can have a moduleID parameter for notifying a source of a signal, and an EventType parameter for defining the generated event.

Preferably, as shown in FIG. 4b, the DCD SERVICE REQUEST message can have a ContentID parameter for notifying an intrinsic ID of the contents requested by the first module 120, and a DCDEventType parameter for notifying event type information so that the DCD server 200 can search for the contents requested by the terminal 100.

(9) The first module 120 transmits the REQUEST message to the DCD server 200.

(10) The DCD server 200 in response to receiving of the REQUEST message personalizes contents according to the ContentID parameter included in the REQUEST message.

(11) The DCD server 200 transmits the personalized contents to the first module 120 of the terminal 100. Here, the contents can be loaded on a GENERATE CONTENT message and transmitted to the terminal 100.

Preferably, as shown in FIG. 4c, the GENERATE CONTENT message can have a Boolean type SERVICE Result parameter. When the DCD server 200 has found the contents for the corresponding event, the DCD server 200 adds the contents and the SERVICE Result parameter having a TRUE value to the GENERATE CONTENT message, and transmits the resultant message. In the case that the DCD server 200 has not found the contents for the corresponding event, the DCD server 200 adds the SERVICE Result parameter having a FALSE value to the GENERATE CONTENT message, and transmits the resultant message.

(12) The first module 120 receiving the personalized contents from the DCD server 200 transmits the personalized contents to the second module 130.

(13) The second module 130 drives the personalized contents, and generates DCD EVENT FINISHED. As shown in FIG. 4d, the DCD EVENT FINISHED can have one of a PROCESS_COMPLETE parameter for notifying successful completion of the operation, and a PROCESS_FAIL parameter for notifying failure of the operation.

As discussed earlier, when the condition is satisfied, the second module 130 of the terminal 100 generates the event and transmits the contents request. However, the DCD server 200 can also monitor whether the condition is satisfied, and provide the personalized contents without the request of the terminal 100. For example, when the condition is the geographical position variation of the terminal 100, the DCD server 200 monitors the position of the terminal 100 by using a global positioning system, and transmits the personalized contents such as the traffic information and the surrounding area information according to the position variation. It will now be explained with reference to FIG. 3.

As depicted in FIG. 3, the DCD server 200 acquires personalization information of the terminal 100, and provides personalized contents.

(1) The DCD server 200 acquires contents through the external contents provision server.

(2)~(3) The DCD server 200 acquires personalization information of the terminal 100 through an external personalization server or the terminal 100.

(4) The DCD server 200 personalizes the acquired contents according to the personalization information.

(5) The DCD server 200 transmits the contents to the first module 120 of the terminal 100.

(6)~(8) This process is identical to that of FIG. 2.

Figure 5:
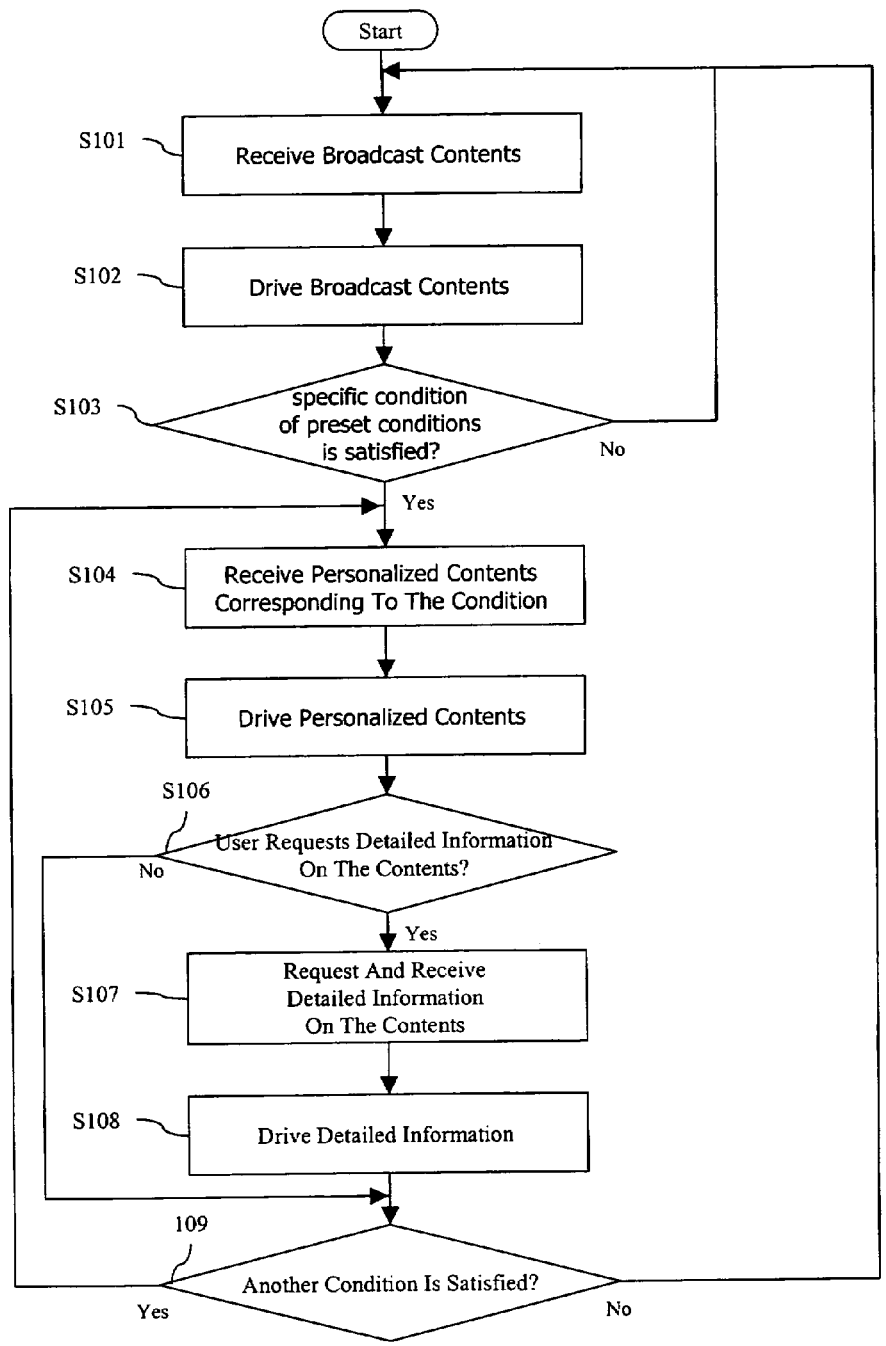
FIG. 5 is an exemplary flowchart showing a method for providing a DCD service executed in the terminal of FIG. 1.

FIG. 5 is an exemplary flowchart showing the method for providing the DCD service executed in the terminal of FIG. 1.

Referring to FIG. 5, the terminal receives broadcast contents from the DCD server (S101). The terminal drives the received broadcast contents (S102).

When the specific condition is satisfied among the pre-defined conditions (S103), the terminal receives personalized contents corresponding to the condition (S104). The terminal drives the received personalized contents (S105). The personalized contents have been described above.

When the user makes a request for detailed information on the received contents (S106), the terminal requests the detailed information on the contents to the DCD server, and receives the detailed information (S107). The terminal drives the received detailed information (S108). For example, when the personalized contents are traffic information, the detailed information can include a smooth traffic flow section or a traffic congestion section, and when the personalized contents are weather information of the day, the detailed information can include weather information of the week.

When another condition is satisfied among the pre-set conditions (S109), the routine goes back to S104 to repeat the process for receiving personalized contents corresponding to the new condition. Here, when the new condition is satisfied, the terminal does not receive the personalized contents corresponding to the previous condition any more.

However, when another condition is not satisfied among the pre-set conditions (S109), the terminal repeats the process for receiving the broadcast contents from the DCD server, completes the whole process, or enters into a standby state.

As discussed earlier, in accordance with the present invention, the personalized contents are provided to the user of the terminal, so that the user can easily access the contents. In detail, when the condition pre-set by the user is satisfied, the personalized contents corresponding to the condition are provided at the right time and place.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile communication terminal, comprising:
a memory configured to store personalization information including one or more preset conditions set by a user or generated by automatically analyzing a contents using pattern of the user;
a first module configured to transmit a contents request to a server to receive personalized contents from the server, and to store the personalized contents, the personalized contents including contents preferred by the user, contents to be provided to the user at a specific time point, information to be provided to the user according to a geographical position of the mobile communication terminal and information related to a specific region; and
a second module configured to automatically generate the contents request to receive the personalized contents corresponding to the preset condition from the server when one of the preset conditions is satisfied, to provide the personalized contents received from the server through the first module to the user, and to drive broadcast contents from the server through the first module in a standby state,
wherein the second module is further configured to monitor whether the preset condition included in the personalization information is satisfied and generate the contents request including a content ID parameter for notifying an intrinsic ID of the personalized contents requested by the first module and an event type parameter for notifying event type information when the preset condition is satisfied, the contents request including a content ID parameter and event type parameter,
wherein the preset conditions comprise a geographical position variation of the mobile communication terminal, an arrival of a designated time and a preferred channel,
wherein the second module is further configured to first generate summary contents related to the personalized contents requested from the server before the first module transmits the contents request to the server, said summary contents being only a part of the personalized contents, and
wherein the second module is further configured to request the first module to stop receiving the broadcast contents from the server when the preset condition is satisfied or re-satisfied, and to restart the driving of the broadcast contents if another preset condition is not satisfied.

2. The mobile communication terminal of claim 1, wherein the first module notifies reception of the personalized contents to the second module, when receiving the personalized contents.

3. The mobile communication terminal of claim 1, wherein the preset condition is set and stored in a user profile.

4. A mobile communication system, comprising:
a dynamic contents delivery (DCD) server configured to acquire contents and personalization information, and personalize the acquired contents into personalized contents according to the personalization information; and
a terminal configured to receive the personalized contents from the DCD server and provide the received personalized contents to a user, the terminal including:
a memory configured to store the personalization information including the one or more preset conditions set by a user or generated by automatically analyzing a contents using pattern of the user;
a first module configured to transmit a contents request to the server to receive the personalized contents from the server, and to store the personalized contents, the personalized contents including contents preferred by the user, contents to be provided to the user at a specific time point, information to be provided to the user according to a geographical position of the mobile communication terminal and information related to a specific region; and
a second module configured to automatically generate the contents request to receive the personalized contents corresponding to the preset condition from the server when one of the preset conditions is satisfied, to provide the personalized contents received from the server through the first module to the user, and to drive broadcast contents from the server through the first module in a standby state, wherein the second module is further configured to monitor whether the preset condition included in the personalization information is satisfied and generate the contents request including a content ID parameter for notifying an intrinsic ID of the personalized contents requested by the first module and an event type parameter for notifying event type information when the preset condition is satisfied, the contents request including a content ID parameter and event type parameter, wherein the preset conditions comprise a geographical position variation of the mobile communication terminal, an arrival of a designated time and a preferred channel, wherein the second module is further configured to first generate summary contents related to the personalized contents requested from the server before the first module transmits the contents request to the server, said summary contents being only a part of the personalized contents, and wherein the second module is further configured to request the first module to stop receiving the broadcast contents from the server when the preset condition is satisfied or re-satisfied, and to restart the driving of the broadcast contents if another preset condition is not satisfied.

5. The mobile communication system of claim 4, wherein, the DCD server acquires the contents from an external contents provision server, if the DCD server has not stored the contents to be provided.

6. A method for providing a dynamic contents delivery (DCD) service in a terminal, the method comprising:

storing, in a memory included in the terminal, personalization information including one or more preset conditions set by a user or generated by automatically analyzing a contents using pattern of the user;

transmitting, via a first module including in the terminal, a contents request to a server to receive personalized contents from the server;

storing the personalized contents in the memory, the personalized contents including contents preferred by the user, contents to be provided to the user at a specific time point, information to be provided to the user according to a geographical position of the mobile communication terminal and information related to a specific region;

automatically generating, via a second module included in the terminal, the contents request to receive the personalized contents corresponding to the preset condition from the server when one of the preset conditions is satisfied, providing the personalized contents received from the server through the first module to the user, and driving broadcast contents from the server through the first module in a standby state;

monitoring, via the second module, whether the preset condition included in the personalization information is satisfied and generating the contents request including a content ID parameter for notifying an intrinsic ID of the personalized contents requested by the first module and an event type parameter for notifying event type information when the preset condition is satisfied, the contents request including a content ID parameter and event type parameter, wherein the preset conditions comprise a geographical position variation of the mobile communication terminal, an arrival of a designated time and a preferred channel;

first generating, via the second module, summary contents related to the personalized contents requested from the server before the first module transmits the contents request to the server, said summary contents being only a part of the personalized contents; and requesting, via the second module, the first module to stop receiving the broadcast contents from the server when the preset condition is satisfied or re-satisfied, and to restart the driving of the broadcast contents if another preset condition is not satisfied.

* * * * *